(12) United States Patent
Halim et al.

(10) Patent No.: US 9,053,250 B2
(45) Date of Patent: Jun. 9, 2015

(54) DUAL-MODE TABLET INPUT SYSTEM WITH PRIMARY COMPUTER WHEREIN FIRST MODE IS KEYBOARD INPUT WITH COMPUTER AND SECOND MODE INVOLVES MIRRORING WITH COMPUTER

(71) Applicant: Hewlett-Packard Development Company, L.P., Houston, TX (US)

(72) Inventors: Irwan Halim, Houston, TX (US);
Thomas J. Flynn, Magnolia, TX (US);
Louis R. Jackson, Jr., Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/850,518

(22) Filed: Mar. 26, 2013

(65) Prior Publication Data
US 2014/0297897 A1 Oct. 2, 2014

(51) Int. Cl.
*G06F 13/00* (2006.01)
*G09G 5/00* (2006.01)
*G06F 13/40* (2006.01)
*G06F 3/147* (2006.01)
*G06F 1/16* (2006.01)

(52) U.S. Cl.
CPC .............. *G06F 13/409* (2013.01); *G06F 3/147* (2013.01); *G06F 1/1632* (2013.01)

(58) Field of Classification Search
CPC ...... G06F 13/409; G06F 3/147; G06F 1/1632
USPC ............ 710/62–64, 72–74, 304, 14; 345/156, 345/169, 2.1, 7
See application file for complete search history.

(56) References Cited

U.S. PATENT DOCUMENTS

| | | | |
|---|---|---|---|
| 6,593,859 B1 * | 7/2003 | Watanabe | 341/20 |
| 6,700,773 B1 * | 3/2004 | Adriaansen et al. | 361/679.08 |
| 7,280,100 B2 * | 10/2007 | Hanson et al. | 345/169 |
| 7,379,055 B2 * | 5/2008 | Chiang et al. | 345/173 |
| 7,471,506 B2 * | 12/2008 | Yin | 361/679.55 |
| 7,898,500 B2 * | 3/2011 | Fuller et al. | 345/1.1 |
| 7,916,463 B2 * | 3/2011 | Aya et al. | 361/679.28 |
| 8,539,114 B2 * | 9/2013 | Zawacki et al. | 710/8 |
| 8,732,373 B2 * | 5/2014 | Sirpal et al. | 710/303 |
| 8,751,973 B2 * | 6/2014 | Han et al. | 715/864 |
| 8,792,429 B2 * | 7/2014 | Hassan et al. | 370/329 |
| 2003/0198008 A1 | 10/2003 | Leapman et al. | |
| 2004/0174395 A1 * | 9/2004 | Liu | 345/773 |

(Continued)

FOREIGN PATENT DOCUMENTS

GB 2479996 A * 2/2011 ............... G06F 9/44

OTHER PUBLICATIONS

Quick, D.; "Samsung Galaxy Smart Dock Turns a Galaxy Note II into a Mini Desktop PC"; Nov. 1, 2012; 5 pages.

*Primary Examiner* — Tammara Peyton
(74) *Attorney, Agent, or Firm* — Hewlett-Packard Patent Department

(57) ABSTRACT

Examples of the present invention disclose a dual-mode tablet input system. According to one implementation, the system includes a portable electronic device configured to communicate with a primary computer. When a connection between the primary computer and portable electronic device is established, a mode change controller affiliated with portable electronic device is configured to switch the portable electronic device from a first operating mode to a second operating mode for facilitating user input on the primary computer and associated display.

20 Claims, 6 Drawing Sheets

(56) References Cited

U.S. PATENT DOCUMENTS

| | | | |
|---|---|---|---|
| 2006/0099994 A1* | 5/2006 | Yang et al. | 455/566 |
| 2010/0033403 A1* | 2/2010 | Liao | 345/2.1 |
| 2010/0317332 A1 | 12/2010 | Bathiche et al. | |
| 2011/0138336 A1* | 6/2011 | Kim | 715/848 |
| 2012/0054401 A1* | 3/2012 | Cheng | 710/304 |
| 2013/0162515 A1* | 6/2013 | Prociw et al. | 345/156 |
| 2014/0139455 A1* | 5/2014 | Argiro | 345/173 |
| 2014/0168100 A1* | 6/2014 | Argiro | 345/173 |

* cited by examiner

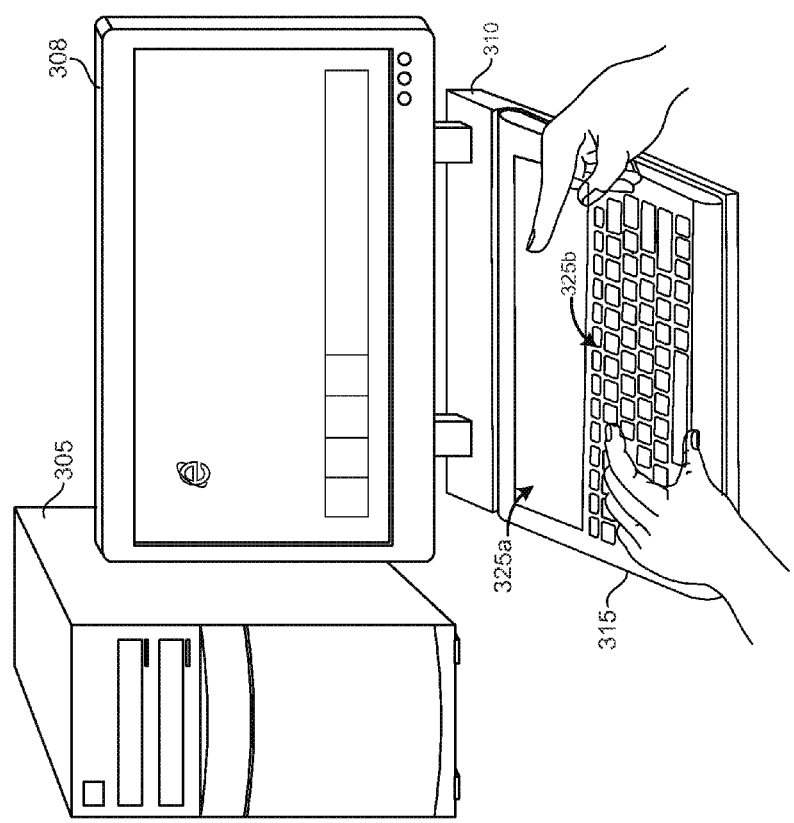

DUAL-MODE TABLET INPUT SYSTEM WITH PRIMARY COMPUTER WHEREIN FIRST MODE IS KEYBOARD INPUT WITH COMPUTER AND SECOND MODE INVOLVES MIRRORING WITH COMPUTER

BACKGROUND

The emergence and popularity of mobile computing has made portable electronic devices, due to theft compact design and light weight, a staple in today's marketplace. One such electronic device, tablet computing systems, employ touch-based input methods that allow a user to physically touch an associated display and have that touch registered as an input at the particular touch location, thereby enabling a user to interact physically with objects shown on the display of the electronic device. Conversely, desktop computing systems generally include a keyboard for allowing a user to manually input information (e.g., characters) into the computer system, and a mouse for selecting or highlighting items shown on an associated display unit. Despite the growth in popularity of portable devices, effective interaction and synergy between the tablet and desktop computing systems is still desired.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIGS. 3A-3C are three-dimensional illustrations of an operating environment utilizing the dual-mode tablet input system and docking station according to an example of the present invention.

DETAILED DESCRIPTION OF THE INVENTION

Figure 1:
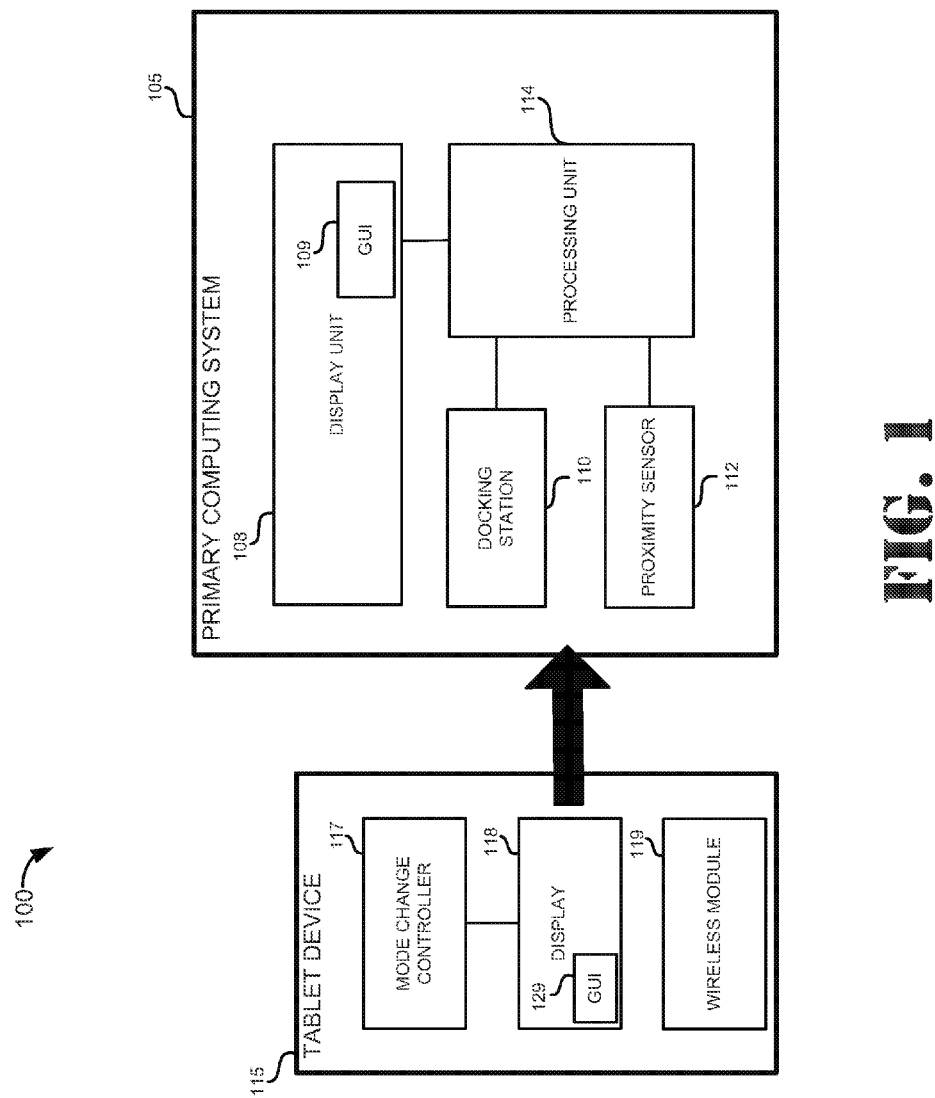
FIG. 1 is a simplified block diagram of the dual-mode tablet input system according to an example of the present invention.

The following discussion is directed to various examples. Although one or more of these implementations may be discussed in detail, the examples disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Today, field professionals such as doctors, salespersons, and the like are often away from their personal or primary computer while performing their duties. Often times, these individuals must travel back to their office or home location in order to retrieve information from their primary computing system. Such back and forth travel activity wastes time and efficiency for these professionals. While laptop computing systems offer mobility and access to information on the go, laptops are also prone to data loss due to theft and/or accidental damage. In addition, due to the larger size, weight, and reduced battery life of laptop computers, these devices are not as practical for travel and mobile computing as the lighter and low-power tablet devices.

Examples of the present invention provide a dual-mode tablet input system. According to one example, a tablet computing device is configured to transform into a personal computer peripheral device when positioned within proximity to a primary computing system or within a docking station associated with the primary computing system. Moreover, the tablet computing device is configured to automatically provide remote access for the primary computing system when not docked or within a threshold proximity of the primary computing system. Accordingly, examples of the present invention enable the tablet computing device to become a natural extension of the primary computing system as a peripheral and remote access device.

Referring now in more detail to the drawings in which like numerals identify corresponding parts throughout the views, FIG. 1 is a simplified block diagram of the dual-mode tablet input system according to an example of the present invention. As shown in this example, the system 100 includes a primary computing system 105 and a portable electronic device such as tablet computing device 115. The primary computing system 105 includes a processing unit 114 coupled to a display unit 108, a docking station 110, and a proximity sensor 112. In one example embodiment, processor 114 represents a central processing unit (CPU), microcontroller, microprocessor, or logic configured to execute programming instructions associated with the primary computing system 105. Display unit 108 represents an electronic visual display configured to display images and/or graphical user interface 109 for enabling interaction between a user and the computing system 105. The docking station 110 represents a docking unit directly connected to the computing system 105, while proximity sensor 112 represents a sensing device such as a inductive proximity sensor or capacitive photoelectric sensor configured to emit an electromagnetic field or signal (e.g., infrared) such that a disturbance or change in the field or signal indicates the presence of an object (e.g., tablet computing device 115). However, any wireless protocol such as Bluetooth and/or NFC wireless communication may be utilized by the primary computer 105 to facilitate proximity detection of the tablet computing device 115.

As will be described in further detail in the following figures, both the docking station 110 and proximity sensor 112 aids in establishing a connection between the tablet computing device 115 and the primary computer 105. Moreover, and in accordance with one example embodiment, the tablet computing device 115 includes a mode change controller 117, display, and wireless module 119. The mode operating module 117 represents a state change controller configured to enable dual-mode functionality and switch the tablet device 115 from a normal tablet operating mode (e.g. remote viewing session) to an input operating mode in which the associated display is configured to accept input from a user with respect to the primary computer system 105 and graphical user interface 109. The wireless module 119 represents wireless communication functionality to aid in detection by the proximity sensor 112 of the primary computer 105 (e.g., via an infrared signal, Bluetooth, NFC), and in establishing wireless communication with the primary computer for hosing a remote viewing session on the tablet computing device 105. The display 118 represents a touch-based interface and includes a graphical user interface (GUI 129) for enabling touch-based interaction between a user and the tablet computing device 115.

Figure 2:
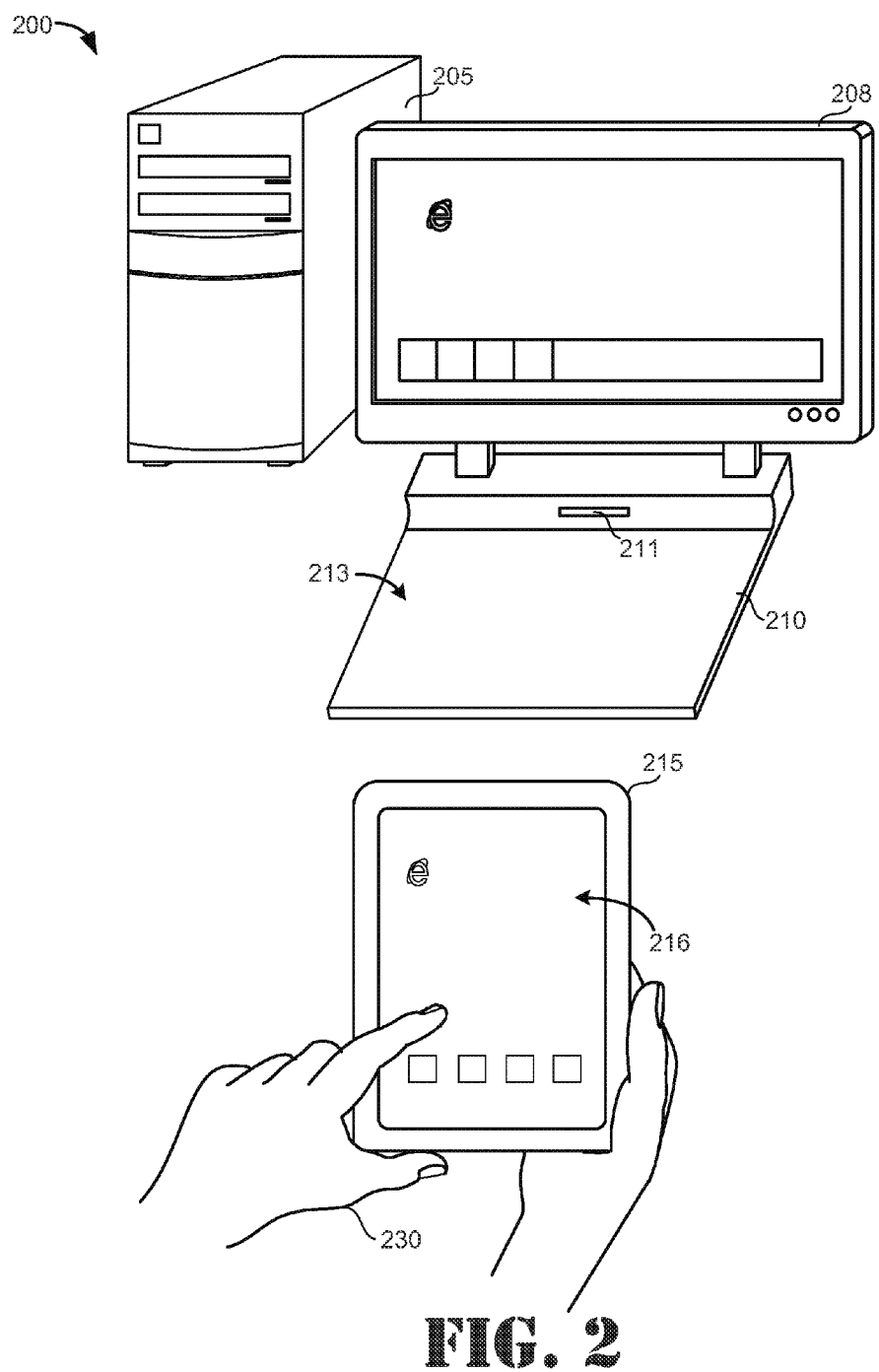
FIG. 2 is a three-dimensional perspective view of the dual-mode tablet input system according to an example of the present invention.

FIG. 2 is a three-dimensional perspective view of the dual-mode tablet input system according to an example of the present invention. As shown here, the system 200 includes a desktop or primary computer 205 and tablet computing device 215. In the present example, the desktop computer 205 includes required computing components such as memory module and a processing unit, and is further coupled to a display unit 208 having an attached docking station 210. The docking station includes a docking area for receiving the tablet computing device in addition to a contact portion 211 for establishing a docking connection with the tablet computing device 215 within the docking area 213. The tablet computing device 215 is operated by a user 230 and includes a viewable display area 216. As shown here, the viewable display 216 may include a remote viewing session of the primary computing system 205 and associated display 208. In accordance with one example, the remote viewing session represents functionality that enables the display 216 of the tablet computing device 215 to serve as the display associated with the primary computer 205. That is, data and information presented on the GUI of the display 208 and primary computer 205 is replicated on GUI the display 216 of the tablet computing device 215 via data streaming over a local area network or similar wireless protocol. In this way, an operating user may have mobile access to their primary computer 205 through use of the tablet computing device 215.

Figure 3A:
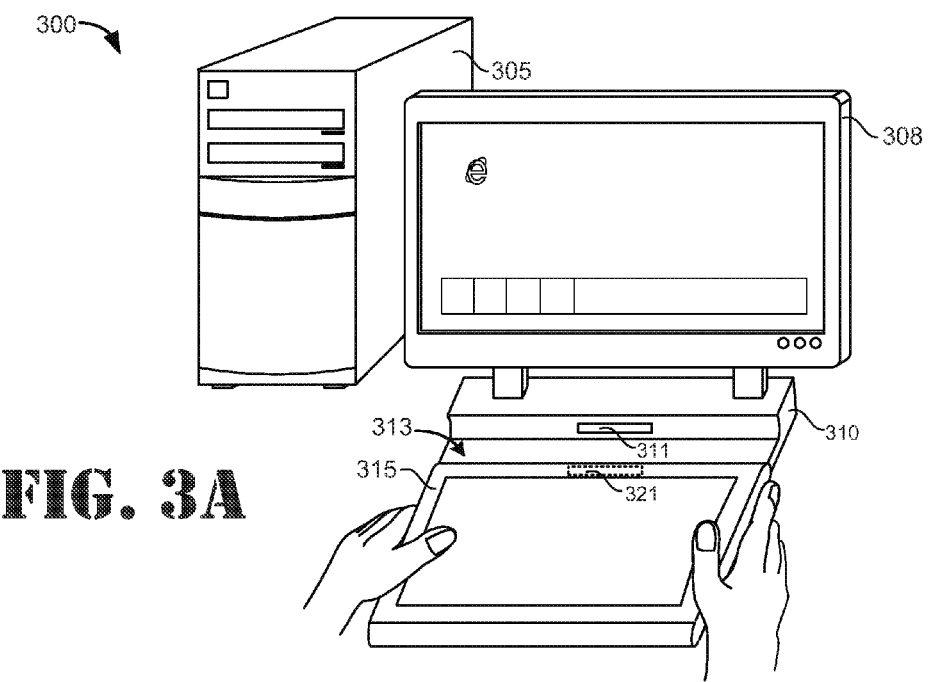
Figure 3B:
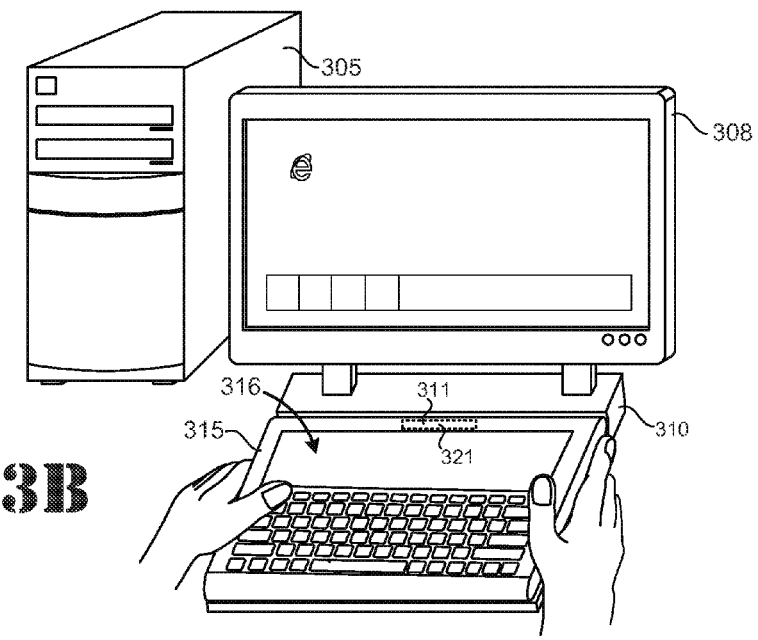

FIGS. 3A-3C are three-dimensional illustrations of an operating environment utilizing the dual-mode tablet input system and docking station according to an example of the present invention. FIG. 3A depicts an operating user attempting to establish a docking connection between the primary computing system 305 and a tablet computing device 315. As shown, the operating user places the tablet computing device 315 within the docking area 313 of the docking station 310 such that a docking connector 321 formed along an outer edge of the tablet computing device 315 aligns with the connector portion 311 of the docking station. FIG. 3B depicts the tablet computing device 315 in a fully docked state within the docking station 310. In accordance with one example, the tablet computing device 315 is considered engaged and docked once the docking connector 321 of the tablet computing device is in physical contact with the connector portion 311 of the docking station. However, the connector portion 311 and/or docking connector 321 may also utilize short-range wireless technology such as near field communication (NFC) or the like, so as to establish non-contact connection between said devices. Moreover, upon establishing a connection with the tablet computing device 315, the processing unit of the primary computing system 305 may then install the tablet computing device 315 as a human interface input device such as a keyboard, mouse, multi-touch pad, or similar input mechanism. However, examples of the present invention are not limited to use of the tablet's display as a human interface input device while in the second operating mode. For example, a built-in microphone, speaker, or similar output device may also be utilized by the primary computer while the tablet device is in the input or peripheral operating mode. Accordingly, the primary computer 305 is able to leverage the full functionality of the tablet computing device 315 when coupled therewith. Furthermore, and in accordance with one example, once a docked connection is established and prior to entering the second operating mode, the primary computer may also be configured to synchronize data with the tablet computing device. Consequently, all data and information entered on the tablet device 315 while in the remote viewing session is able to be transferred and preserved on the primary computer 305 prior to switching the tablet device 315 to the input operating mode.

As shown in FIG. 3B, the tablet computing device and mode change controller terminates the current operating mode and switches the device into a second operating mode for facilitating user input on the primary computing system 305. In one example, the second or input operating mode is established by the mode change controller so as to switch the display and GUI of the tablet device from a normal view to an input mode view and act as a human interface input device for enabling touch-based input. For instance, and as shown in FIG. 3C, the input mode view may include a mouse or cursor input area 325a used to navigate an on-screen cursor shown on the GUI of display 308 associated with the primary computing system 305, in addition to a keyboard input area 325b used to facilitate character input on the GUI and display 308 associated with the primary computing system 305. Accordingly, examples described herein enable the tablet computing device 305 to become a peripheral input device for the primary computing system 305.

Figure 4:
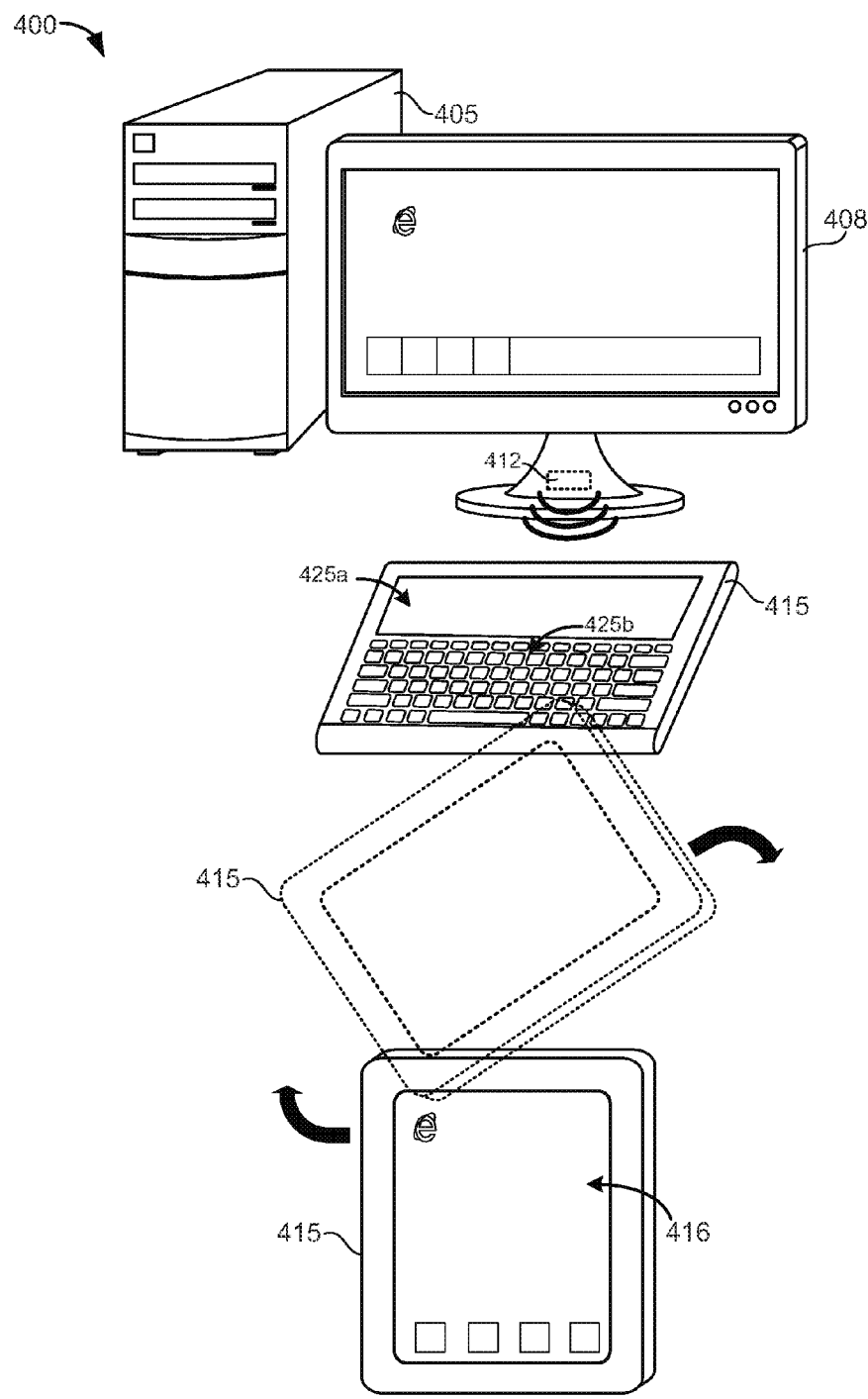
FIG. 4 is a three-dimensional illustration of another operating environment utilizing the dual-mode tablet input system and proximity sensing according to an example of the present invention.

FIG. 4 is a three-dimensional illustration of another operating environment utilizing the dual-mode tablet input system and proximity sensing according to an example of the present invention. As shown in the present example, the primary computing system 405 includes a proximity sensor 412 formed near a lower area or stand of the display 408. However, the proximity sensor 412 may be positioned outside the primary computer or within the housing or display associated with primary computer 405. Moreover, when the primary computer 405 detects that that the tablet computing device 415 is within a threshold proximity (e.g., two feet or less), then the primary computer 405 attempts to establish a connection with the tablet computing device 415. Once authentication succeeds and a connection is established, the processing unit of the primary computer may then install the tablet computing device 415 as human interface input device as described above. Concurrently, the tablet computing device terminates the current operating mode (e.g., remote viewing session) and switches into a human interface input device (i.e., second operating mode). The tablet device 415 may also be configured to suspend the central processing unit, Wi-Fi, and other peripherals that are not in use so as to prolong the battery life.

In accordance with one example embodiment, when tablet computing device 415 is moved away from dose proximity (i.e., threshold distance) to the primary computer, the mode change controller of the tablet computing device quits the human interface input device mode, and automatically resumes a tablet or standard operating mode, in which the user navigates the operating system and displayed objects of the tablet device directly rather than the primary computer display (i.e., 408). For instance, a connection may be automatically established between the primary computer 405 and the tablet device 415 so as to provide a remote viewing session of the primary computing system 405 on the tablet computing system 415 as described above. And for additional cost savings, the operating system of the tablet computing device 415 may be configured for only remote access to the primary computer 405 and the touch input interface functionality described herein.

Figure 5:
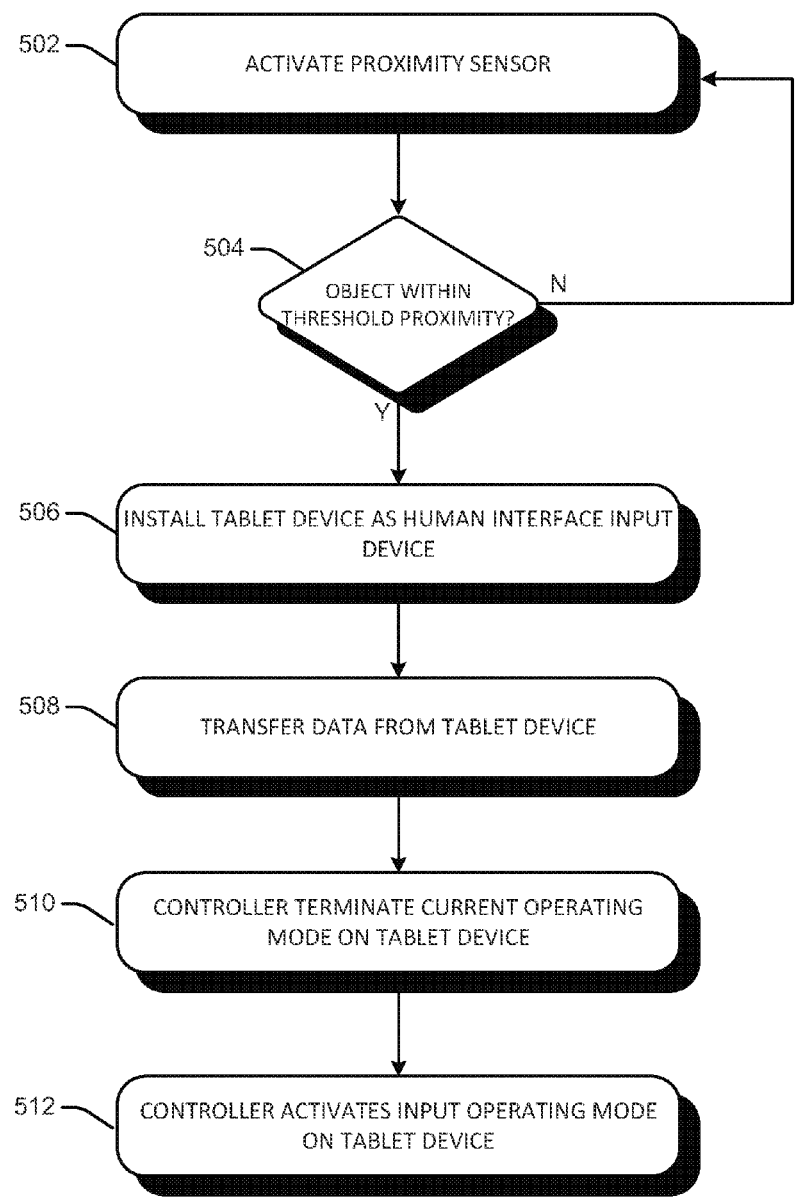
FIG. 5 is a simplified flow chart of the processing steps for enabling the dual-mode tablet input system in accordance with one example of the present invention.

FIG. 5 is a simplified flow chart of the processing steps for enabling the dual-mode tablet input system in accordance with one example of the present invention. In step 502, the primary computing system activates the proximity sensor in order to detect the presence of the tablet device within a threshold proximity of the primary computing system as described above. The threshold proximity may be configured by the operating user or manufacturer and may represent the tablet device being positioned within a usable operating distance of the primary computer (e.g., within two feet), or a sufficient distance for establishing a short-range wireless connection. Upon detecting the tablet device in step 504, the processing unit of the primary computer installs the tablet device as a human interface input device in step 506. Thereafter, data from the tablet device may be transferred and synchronized with the primary computing system in step 508. Next, upon establishing the connection with the primary computer, the mode change controller terminates the current operating mode and GUI in step 510, and then activates the second operating mode in step 512. In accordance with one example, the second operating mode represents an peripheral input mode in which a both touch-based keyboard input area (e.g., full-sized QWERTY keyboard) and a touch or cursor input area are displayed on the tablet computing device so as to facilitate user input on the connected primary computer and associated display.

Examples described herein provide a dual-mode tablet input system. Moreover, many advantages are afforded by the tablet input system according to implementations of the present invention. For instance, communication between the tablet computing device and the primary computing device may be established via proximity sensors, wireless connectivity, or a wired connection. Moreover, an example of the present invention enables the tablet computing device to automatically become a remote access device (when outside threshold proximity) so as to allow convenient access to data on the primary computing device at any time or location. In addition, operation as a remote access device allows for low hardware maintenance and lower data loss risk. Still further, example embodiments provide a robust solution that enables a tablet computing device to easily and quickly become a touch surface peripheral device on demand.

Furthermore, while the invention has been described with respect to example embodiments, one skilled in the art will recognize that numerous modifications are possible. For example, although the present examples depict a desktop and associated display as the primary computing system, the invention is not limited thereto. For example, the primary computing system may be an all-in-one personal computer, netbook, or similar computing system capable of utilizing a touch-based peripheral as described above.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element. In addition, the term "having" and "including" is synonymous comprising.

It is to be noted that, although some examples have been described in reference to particular implementations, other implementations are possible according to some examples embodiments. Additionally, the arrangement a order of elements or other features illustrated in the drawings or described herein need not be arranged in the particular way illustrated and described. Many other arrangements are possible according to some examples.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. A dual-mode tablet input system comprising:
a portable electronic device having a mode change controller and configured to communicate with a primary computer having a display, the primary computer operable independently of the portable electronic device in that the primary computer runs computer programs separately from the portable electronic device, the primary computer external to and separate from the portable electronic device;
wherein upon establishing a wired connection between the portable computing device and the primary computer, the mode change controller is configured to switch the portable electronic device from a first operating mode in which the portable computing device and the primary computer are operable independently of one another to a second operating mode for facilitating user input on the primary computer and associated display, the portable electronic device in the second operating mode serving as a primary input device of the primary computer by which both textual input and graphical user interface (GUI) pointer input are primarily provided, the portable electronic device in the second operating mode serving both as an only text input device of the primary computer by mimicking a full-size keyboard and as an only pointer-movement input device of the primary computer by mimicking a touchpad,
wherein upon establishing a direct wireless connection between the portable computing device and the primary computer the mode change controller is configured to switch the portable electronic device from the first operating mode to a third operating mode for facilitating the user input on the primary computer, the portable electronic device in the third operating mode serving as a secondary input device of the primary computer and as a secondary display of the primary computer in which content displayed on the associated display is mirrored on the portable electronic device.

2. The input system of claim 1, wherein the portable computing device includes a docking connector formed along an edge the portable electronic device.

3. The input system of claim 1, wherein the primary computer includes a sensor to detect the proximity of the portable electronic device to the primary computer, and
   wherein when the portable electronic device is within a threshold proximity of the primary computer, the portable electronic device is configured to switch to the second operating mode and the primary computer installs the portable electronic device as a human interface input device.

4. The input system of claim 3, further comprising:
   a docking station connected to the primary computing system, wherein the docking station includes a docking area and a contact portion formed within the docking area.

5. The input system of claim 4, wherein the mode change controller of the portable electronic device switches to the second operating mode upon being placed within the docking area of the docking station such that the docking connector of the portable electronic device engages with the contact portion of the docking station.

6. The input system of claim 1, wherein the first operating mode is a tablet operating mode and the second operating mode is a peripheral input operating mode.

7. The input system of claim 1, wherein when in the input operating mode the portable electronic device displays both a keyboard input area and an adjacent touch input area for facilitating user input on the display of the primary computer.

8. The input system of claim 3, wherein the portable electronic device is configured to transfer data entered at the portable electronic device while operating in the first operating mode with the primary computer before entering the second operating mode, to preserve the data at the primary computer.

9. A dual-mode input tablet system comprising:
   a first computing system having a display and an attached docking station; and
   a tablet device including a mode change controller for enabling dual operating modes on the display, the first computing system operable independently of the tablet device in that the first computing system runs separately from the tablet device, the first computing m external to and separate from the tablet device,
   wherein when the tablet device is in a wired docked state with the docking station associated with first computing system, the mode change controller is configured to switch the tablet device from a first operating mode in which the tablet device and the first computing system are operable independently of one another to a second operating mode for facilitating user input on the first computing system and associated display, the table device in the second operating mode serving as a primary input device of the first computing system by which both textual input and graphical user interface (GUI) pointer input are primarily provided, the table device in the second operating mode serving both as an only text input device of the first computing system by mimicking a full-size keyboard and as an only pointer-movement input device of the first computing system by mimicking a touchpad,
   wherein when the tablet device is in a direct wireless docked state with the docking station associated with the first computing system the mode change controller is configured to switch the tablet device from the first operating mode to a third operating mode for facilitating the user input on the primary computer, the tablet device in the third operating mode serving as a secondary input device of the primary computer and as a secondary display of the primary computer in which content displayed on the associated display is mirrored on the tablet device.

10. The system of claim 9, wherein the tablet device includes a docking connector formed on an edge of a housing associated with the tablet device.

11. The system of claim 10, wherein the docking station includes a docking area and a contact portion formed within the docking area.

12. The system of claim 11, wherein the tablet device switches to the second operating mode upon being placed within the docking area of the docking station such that the docking connector of the tablet device engages with the contact portion of the docking station.

13. The system of claim 9, wherein the first operating mode is a tablet operating mode including a remove viewing session of the first computing system while the second operating mode is a peripheral input operating mode for enabling touch-based input on the first computing system.

14. The system of claim 9, wherein when in the input operating mode the tablet device displays both a keyboard input area and an adjacent touch input area for facilitating user input on the first computing system.

15. The system of claim 9, wherein the tablet device is configured to transfer data entered at the tablet device while operating in the first operating mode to the first computing system before entering the second operating mode, to preserve the data at the first computing system.

16. A method for providing dual-mode tablet input system comprising:
   activating a proximity sensor on a first computing system having a display, the first computing system operable independently of a tablet computing device in that the first computing system runs computer programs separately from the tablet computing device, the first computing system external to and separate from the tablet computing device;
   detecting the presence of the tablet computing device within a threshold proximity of the primary computing system and as having a wired connection with the first computing system via the proximity sensor;
   wherein detection of the tablet computing device within the threshold proximity and as having the wired connection with the first computing system further comprises:
      switching, via a mode change controller associated with the tablet computing device, the tablet computing device from a tablet operating mode in which the tablet computing device and the first computing system are operable independently of one another to a primary input operating mode for facilitating user input on the primary computer and an associated display, the table computing device in the primary input operating mode serving as a primary input device of the first computing system by which both textual input and graphical user interface (GUI) pointer input are primarily provided, the tablet computing device in the second operating mode serving both as an only text input device of the first computing system by mimicking a full-size keyboard and as an only pointer-movement input device of the first computing system by mimicking a touchpad; and
   detecting the tablet computing device as having a direct wireless connection with the first computing system;

wherein detection of the tablet computing device as having the direct wireless connection with the first computing system further comprises:
  switching, via the mode change controller, the tablet computing device from the tablet operating mode to a secondary input operating mode for facilitating the user input on the first computing system, the tablet computing device in the secondary input serving as a secondary input device of the first computing system and as a secondary display of the first computing system in which content displayed on the display of the first computing system is mirrored on the tablet computing device.

17. The input system of claim 16, wherein detection of the tablet computing device within the threshold proximity further comprises:
  installing, via a processing unit associated with the primary computing system, the tablet device as a human interface input device.

18. The input system of claim 16, wherein detection of the tablet computing device within threshold proximity further comprises:
  transferring data from the tablet computing device to primary computing system prior to entering the second operating mode.

19. The input system of claim 16, wherein detection of the tablet computing device within threshold proximity further comprises
  terminating, via the mode change controller, the current operating mode on the tablet device; and
  activating, via the mode change controller, the input operating mode on the tablet computing device.

20. The input system of claim 16, wherein when in the input operating mode the tablet computing device displays both a keyboard input area and an adjacent touch input area for facilitating user input on the primary computing system.

\* \* \* \* \*

UNITED STATES PATENT AND TRADEMARK OFFICE
CERTIFICATE OF CORRECTION

PATENT NO. : 9,053,250 B2  
APPLICATION NO. : 13/850518  
DATED : June 9, 2015  
INVENTOR(S) : Irwan Halim et al.

Page 1 of 1

It is certified that error appears in the above-identified patent and that said Letters Patent is hereby corrected as shown below:

In the Claims

In column 6, line 59, in Claim 1, delete "computer" and insert -- computer, --, therefor.

In column 7, line 43, in Claim 9, delete "m" and insert -- system --, therefor.

In column 7, line 64, in Claim 9, delete "system" and insert -- system, --, therefor.

In column 9, line 8, in Claim 16, delete "input" and insert -- input operating mode --, therefor.

Signed and Sealed this  
Eighth Day of December, 2015

Michelle K. Lee  
*Director of the United States Patent and Trademark Office*